(12) United States Patent
Linquist et al.

(10) Patent No.: US 8,078,155 B2
(45) Date of Patent: Dec. 13, 2011

(54) CALL PROCESSING FOR GROUP CONFERENCING

(75) Inventors: Roger D. Linquist, Dallas, TX (US);
Malcolm M. Lorang, Dallas, TX (US);
Ronald Unger, Dallas, TX (US);
Kenneth J. Geisheimer, Plano, TX (US); Shiang Yueng Feng, Tucson, AZ (US)

(73) Assignee: MetroPCS Wireless, Inc., Richardson, TX (US)

( * ) Notice: Subject to any disclaimer, the term of this patent is extended or adjusted under 35 U.S.C. 154(b) by 325 days.

(21) Appl. No.: 12/495,444

(22) Filed: Jun. 30, 2009

(65) Prior Publication Data

US 2010/0136980 A1 Jun. 3, 2010

Related U.S. Application Data

(60) Provisional application No. 61/076,693, filed on Jun. 30, 2008.

(51) Int. Cl.
*H04M 3/42* (2006.01)

(52) U.S. Cl. ........... 455/416; 455/445; 455/414.1; 370/259; 370/260; 379/202.01

(58) Field of Classification Search .......... None
See application file for complete search history.

(56) References Cited

U.S. PATENT DOCUMENTS

| | | | |
|---|---|---|---|
| 5,963,864 A | 10/1999 | O'Neil et al. | |
| 6,829,341 B2 | 12/2004 | Contreras | |
| 6,996,221 B1 | 2/2006 | Baiyor et al. | |
| 6,996,414 B2 | 2/2006 | Vishwanathan et al. | |
| 7,324,473 B2 * | 1/2008 | Corneille et al. | 370/328 |
| 2003/0125072 A1 | 7/2003 | Dent | |
| 2004/0057449 A1 * | 3/2004 | Black | 370/432 |
| 2005/0260976 A1 | 11/2005 | Khartabil et al. | |
| 2006/0172727 A1 | 8/2006 | Lee | |
| 2007/0281674 A1 | 12/2007 | Mock et al. | |
| 2008/0132222 A1 | 6/2008 | Brady | |
| 2011/0136431 A1 * | 6/2011 | Haaramo et al. | 455/41.1 |

OTHER PUBLICATIONS

PCT: International Preliminary Report on Patentability of PCT/US2009/049287 (related application); Jan. 13, 2011.
PCT: Written Opinion and International Search Report of PCT/US2009/049284 (counterpart application); Feb. 5, 2010; 7 pgs.
PCT: International Search Report and Written Opinion of PCT/US2009/049287 (related application); Feb. 11, 2010; 7 pgs.
PCT: International Preliminary Examination Report of PCT/US2009/049284 (counterpart application); Feb. 11, 2011, 7 pgs.
PCT: International Preliminary Examination Report of PCT/US2009/049284 (counterpart application); Feb. 2, 2011.

* cited by examiner

*Primary Examiner* — Ajit Patel

(74) *Attorney, Agent, or Firm* — Howison & Arnott, L.L.P.

(57) ABSTRACT

A group call conferencing system and method is disclosed wherein a call to a Virtual Home Phone (VHP) number is processed by a Virtual Home Phone Session Control Function (VHPSCF) to ring all family or group member mobile phones. Any family member can answer the call through a conference bridge set up by the VHPSCF and other family members can participate in the call before the call ends by connecting to the conference bridge.

26 Claims, 14 Drawing Sheets

| MEMBER | TIME | VOICE MAIL | MESSAGING | ADMIN |
|---|---|---|---|---|
| XXX-XXX-XXXX | 7AM-9PM | | NO | 2 |
| XXX-XXX-XXXX | | YES | YES | 1 |
| XXX-XXX-XXXX | | NO | | NO |
| XXX-XXX-XXXX | | | | |

CALL PROCESSING FOR GROUP CONFERENCING

CROSS-REFERENCE TO RELATED APPLICATIONS

This application claims benefit of U.S. Provisional Application for Patent Ser. No. 61/076,693, filed Jun. 30, 2008, and entitled "VIRTUAL HOME PHONE" the specification of which is incorporated herein in its entirety by reference.

TECHNICAL FIELD

The present application relates to telecommunications, and more particularly to method, apparatus and system of telecommunication call session control.

BACKGROUND

Most homes in modern societies have multiple telephone sets sharing one telephone number provided by a fixed line Public Switched Telephone Network (PSTN) or broadband Voice Over Internet Protocol (VoIP) network operator. Over the last few years, the use of fixed line home phones has been greatly reduced as the popularity of mobile telephones has increased. However, many households still retain their fixed line home telephones for various reasons. One such reason is that family members can share a common phone number and talk to the same external caller at the same time. Current mobile phone service providers are unable to provide a comparable function unless family members invoke a multiple party call procedure from each of the family member's mobile phones.

Many families and groups today have multiple cellular devices having different telephone numbers that are incorporated into a single billing plan. For example, a family plan may include three or more telephone numbers assigned to different cellular devices with a fixed number of minutes allocated on a monthly basis for all members of the plan. The telephone numbers assigned to the family plan may be linked in a database for billing purposes. However, as noted above, a multiparty, (e.g. greater than two), call with other family members using a cellular device requires one or more parties to a call to invoke a multiple call procedure using special software and/or hardware in the cellular device.

By way of background, typical call processing functions can be found in IETF RFC 2543, Session Initiation Protocol (SIP). Telephony equipment implementing call processing functions may include a Mobile Switch Center (MSC) in the cellular network, a Class 5 Switch in the Public Switched Telephone Network (PSTN) and a SIP server in the wireless or fixed line Internet Protocol (IP) network.

SUMMARY

In one aspect, a method of providing call processing for group conferencing includes associating cellular telephone numbers assigned to a predetermined group of subscriber cellular devices with a routable telephone number in a database whereby calls to the routable telephone number are routed to a gateway mobile switching center of a cellular service provider. A first call to the routable number is received by the gateway mobile switching center. The database is accessed to retrieve the telephone numbers assigned to the group of cellular subscriber devices. Calls to the cellular telephone numbers assigned to the group of cellular subscriber devices are initialized and a ring timer is initiated. In other embodiments an integrated or separate home locator resource or similar platform may be utilized to identify and route calls placed to the routable number or number(s).

A first answer from at least one of the called subscriber devices is detected and the first call is connected to the first answering cellular subscriber device with a conference bridge. Calls from subscriber devices that answer before the ring timer expires and after the first answering cellular subscriber device are detected and connected to the call via the conference bridge. In other embodiments, a user call redirect may be utilized to trigger a connection and direct the call to a conference bridge.

In one variation, the method further includes optionally initiating a grace timer at the time the first answer is detected whereby calls to non-answering cellular subscriber devices are terminated when the grace timer lapses. In one embodiment, a message such as a SMS message is transmitted to the non-answering cellular subscriber devices indicating that a call was placed to the routable number and/or that a voice message was left.

The method may further include determining whether the subscriber devices are within the geographical coverage area of a cellular service provider and initiating calls to the cellular telephone numbers assigned to the group of cellular subscriber devices only to those cellular subscriber devices in the cellular service provider's geographical coverage area. In another variation, the specific location of the subscriber devices is determined and calls are initiated only to only those cellular devices at a specific location, for example a subscriber's home or office.

In another aspect, a method of providing call processing for group conferencing includes receiving a first call from a calling party telephone device to a routable telephone number associated with a gateway mobile switching center. A database wherein the routable telephone number is associated with a predetermined group of cellular subscriber telephone numbers is accessed and the associated numbers are retrieved. Calls to the associated cellular telephone numbers are initiated from the gateway mobile switching center to the predetermined group of cellular subscriber telephone numbers. A ring timer is initiated and a first answer from at least one of the called cellular subscriber devices is detected. A full duplex voice path is created between the calling party telephone device and the first answering cellular subscriber device. Voice paths are also created between the calling party telephone device and cellular subscriber devices from the predetermined group that answer after the first answering cellular subscriber device and before the ring timer lapses. In one aspect, the method further includes associating the routable telephone number with each of the predetermined group of cellular subscriber telephone numbers in the database accessible to one or more switching platforms in the mobile gateway switching center, or outside of the switch center, e.g., any routable telephone number.

In one variation, the method includes determining if the calling party telephone device is assigned one of the predetermined group of cellular telephone numbers. If not, the method may include receiving a personal identification number or code from the calling party before initiating calls to the predetermined group of cellular subscriber telephone numbers.

Methods and systems described herein do not require a "client" (e.g. dedicated software/hardware for conferencing) on cellular telephone devices used by the family or group members to mimic a home telephone network wherein multiple telephone sets share a single line. In one embodiment, the hardware and software used in methods according to the invention is switch-based, e.g. on the switching platform or platform(s) of the cellular provider and can be accessed from any connection in the telephone network by means of a routable number. Other cellular telephone conferencing systems and methods typically require specific hardware and/or software in the cellular device and/or require each member of a conference to dial into a conference. In one variation, the method allows for a group or family member to initiate a call to a routable telephone number to establish or initiate a call to other or selected family or group members from any connection on the telephone network.

In one embodiment, a group call conferencing system and method mimics a home phone. In one embodiment, a call to a Virtual Home Phone (VHP) number is processed by a Virtual Home Phone Session Control Function (VHPSCF) to ring all family or group member mobile phones. Any family member can answer the call through a conference bridge set up by the VHPSCF. All other family members can participate in the call before the call ends by connecting to the conference bridge. VHP also provides a voicemail box to mimic a home answering machine. When a party hangs up, VHPSCF removes this party from the conference bridge. The call session is terminated when the total number of parties connected to the conference bridge is one or less. When the call is not answered, VHPSCF redirects the call to a VHP voicemail box. A family member can later access and manage the message.

In another aspect thereof, a method of providing call processing for group conferencing includes associating telephone numbers assigned to a predetermined group with a routable telephone number in a database whereby calls to the routable telephone number are routed to a switching center of a service provider. A first call to the routable telephone number is received by the switching center. The database is accessed to retrieve the telephone numbers assigned to the group and associated with the routable telephone number. Calls to the telephone numbers are initiated and a ring timer is initialized. In one embodiment, a personal identification code is required before the calls to the telephone numbers assigned to the group of devices are initiated.

A first answer from at least one of the called devices is detected and the first call is connected to the first answering device with a conference bridge. Calls from other devices in the group that answer prior to the ring timer expiring and after the first answer are detected and connected to the call via the conference bridge. In one variation, a grace timer is initialized when the first answer is detected whereby calls to the non-answering devices are terminated with the grace timer lapses. In one embodiment, an SMS message is transmitted to the non-answering devices thereby notifying those devices that a call was placed to the routable number. In another embodiment, an MMS message is transmitted to the non-answering devices. In yet another embodiment, an email message is transmitted to the non-answering devices.

In one embodiment, the method further includes determining whether the devices are within the geographical coverage area of the service provider and initiating calls to the assigned numbers in the group only to the devices in the service provider's geographical coverage area. In another variation, the specific location of the devices is determined and calls are initiated only to those devices at a specific location, for example, a group member's office.

In another aspect, a method of providing call processing for group conferencing includes receiving a first call from a calling party telephone device to a routable telephone number associated with a switching center. A database wherein the routable telephone number is associated with a predetermined group of telephone numbers is accessed and the telephone numbers of the predetermined group are retrieved. The switching center initiates calls to the predetermined group of telephone numbers and a ring timer is initialized.

A first answer from at least one of the called devices is detected and a voice path between the calling party telephone device and the first answering device is created. Voice paths are created for devices of the predetermined group that answer after the first device answers and before the ring timer lapses. In one embodiment, a message is transmitted the non-answering telephone numbers in the predetermined group that a call was placed to the routable number. The message may be SMS, MMS, email or any type supported by a particular device. In one variation, the method further includes associating the routable telephone number with each of the predetermined group of telephone numbers in the database.

In one embodiment, the method includes determining if the calling party telephone device is assigned one of the predetermined group of telephone numbers. If not, the method may include receiving a personal identification code before initiating calls to the predetermined group of telephone numbers.

BRIEF DESCRIPTION OF THE DRAWINGS

For a more complete understanding, reference is now made to the following description taken in conjunction with the accompanying Drawings in which.

DETAILED DESCRIPTION

Figure 1:
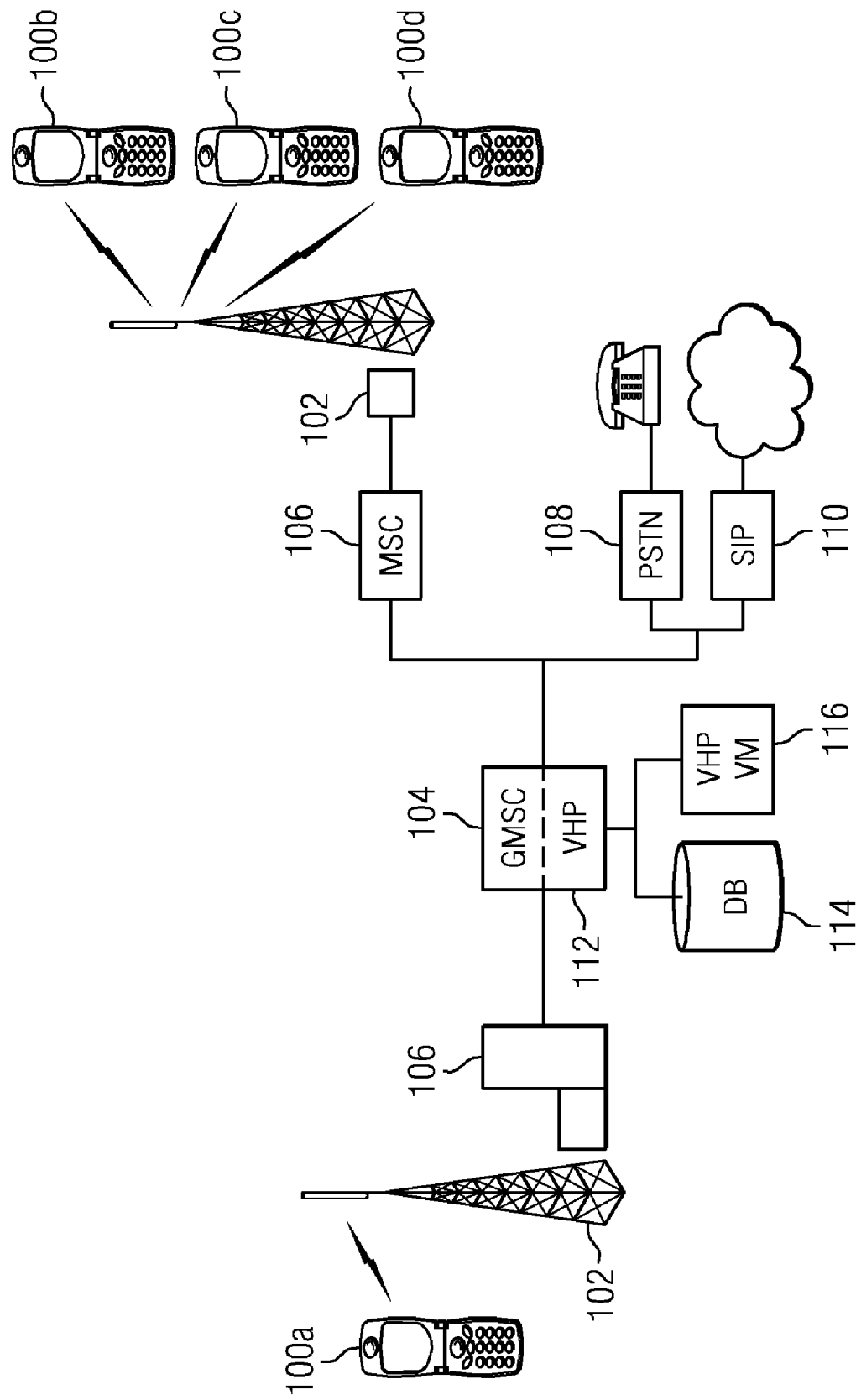
FIG. 1 is an overall diagram for a system utilizing call processing for group conferencing according to one embodiment of the disclosure.

Referring now to the drawings, wherein like reference numbers are used herein to designate like elements throughout, the various views and embodiments of a virtual home phone are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a diagrammatic view of a cellular network system wherein a subscriber with a subscriber handset 100a may wish to place a call to a plurality of recipients having handsets 100b, 100c and 100d. In one embodiment, calls made from handset 100a are received by a cellular base station 102 in the cellular telephone network and routed to a Gateway Mobile Switching Center (GMSC) 104 that may be connected to one or more Mobile Switching Centers 106 that in turn may provide connections to other base stations 102. GMSC 104 may also provide connections to the Public Switched Telephone Network (PSTN) 108 and a SIP server 110 in the wireless or fixed line Internet Protocol (IP) network. As will be appreciated, other configurations and connection routing are possible. For example, the functions of GMSC 104 may be integrated into MSC 106. Calls initiated on PSTN 108 or on a fixed line IP network may be connected through GMSC 104. Calls initiated or connected through MSC 106 may be switched through PSTN 108 to GMSC 104.

In order to implement a Virtual Home Phone (VHP), in one embodiment, GMSC 104 includes a VHP Server 112 having an associated VHP database 114 and a VHP voicemail server 116. As will be appreciated, GMSC 104, VHP server 112 and VHP voicemail server 116 may consist of the same or different hardware platforms.

Figure 2:
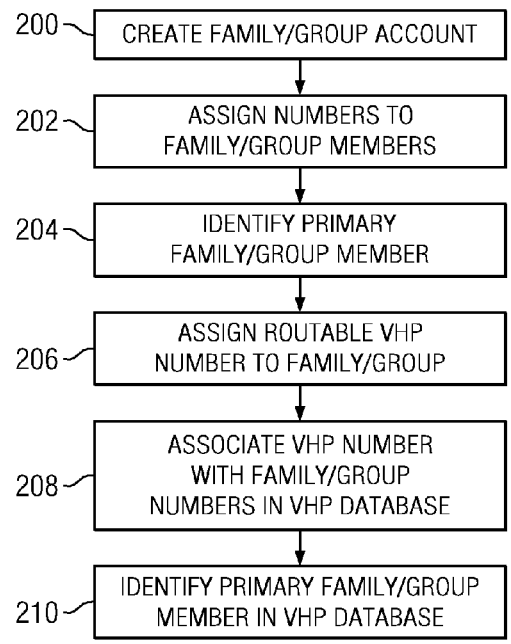
FIG. 2 is a flow chart illustrating a method of creating a group conferencing account according to one embodiment of the disclosure.

FIG. 2 is a flow chart of a method of providing a VHP to a cellular customer in a group or family plan. At step 200, the cellular service provider creates a group or family account for the customer. A plurality of routable telephone numbers, including cellular telephone numbers, landline phone numbers or VOIP numbers are assigned to subscribers in the group or family (step 202) and a primary family or group member is identified (step 204). As described in more detail below, the primary group or family plan member may be allowed to control features and functions of the VHP. For example, the primary member may control access to voicemail and/or whether other members of the family or group receive a ring by the other members of the family or group. If desired, a routable VHP number is assigned to the family or group at step 206. In one embodiment, the VHP number is a routable ten digit telephone number that is associated with the family or group subscriber numbers in VHP database 114 (step 208). The primary family or group member may also be identified in VHP database 114 (step 210). In other embodiments, any group or family member may Referring again to FIG. 1, calls to the VHP number are routed in the telephone system to GMSC 104. In one embodiment, the cellular service provider may reserve a block of routable telephone numbers for use in the VHP application. In other embodiments, the cellular service provider may simply assign available routable numbers assigned to the provider to family or group plans. In either case, calls to the VHP number will be routed to GMSC 104.

Figure 3:
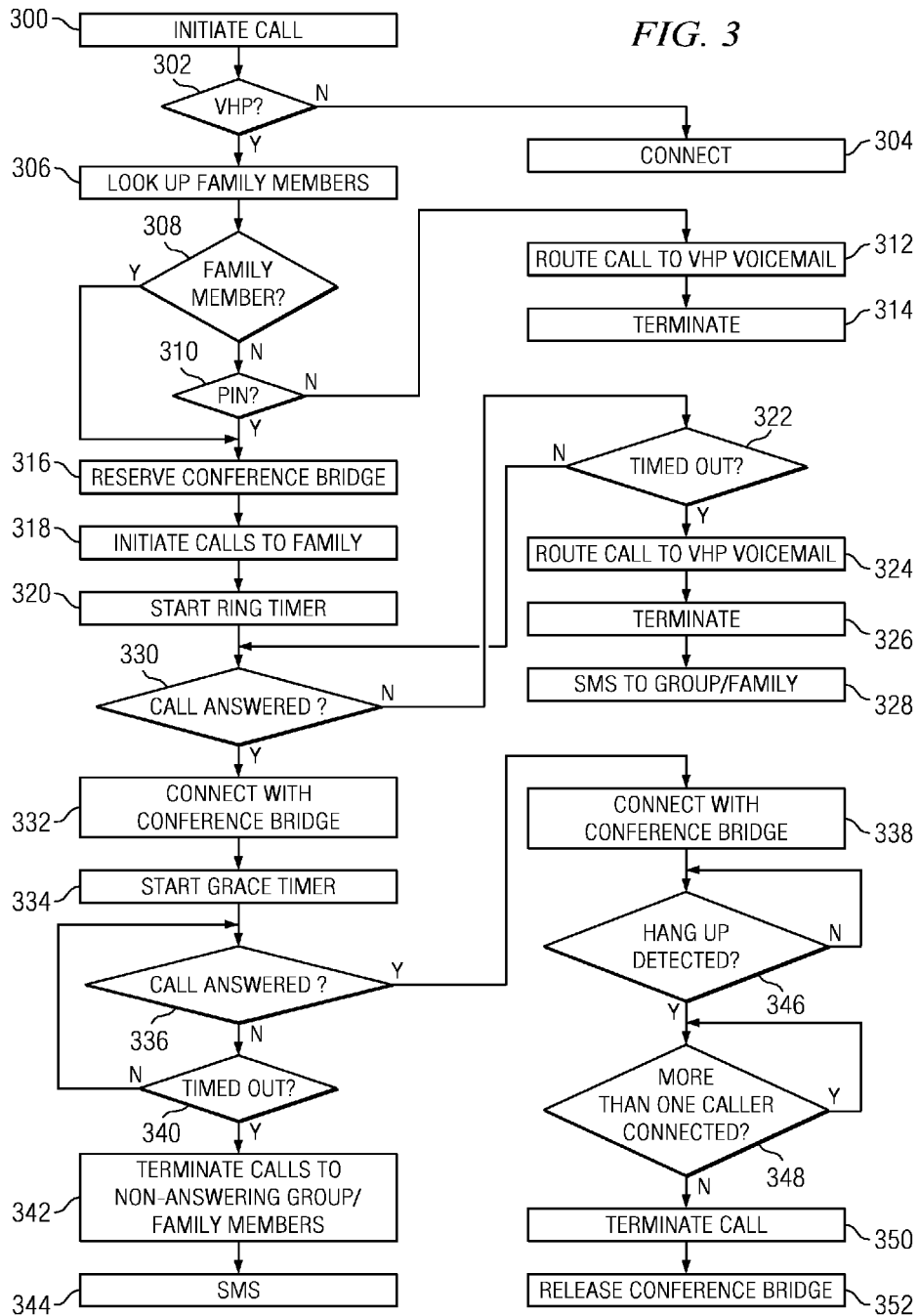
FIG. 3 is a flow chart illustrating call processing for group conferencing according to one embodiment of the disclosure.

FIG. 3 is a flow chart illustrating the processing of a call placed to the VHP telephone number associated with a family or group. Referring to FIGS. 1 and 3, at step 300 a call is initiated and routed to GMSC 104. In one embodiment, the call may be initiated anywhere on the telephone system, for example, on a cellular network, on the PSTN, or on the fixed line Internet Protocol (IP) network. In other embodiments, the VHP system may be "closed," e.g., the VHP may be accessed only by calls originating from subscriber devices of a subscribing family or group subscribing to a particular cellular provider. In other embodiments, the call may be routed directly to a home MSC wherein the switch communicates with a HLR (Home Locator Record) to obtain the data necessary to route and bill the call.

At step 302, GMSC 104 determines whether the call is directed to a routable VHP number. If not, the call is connected with standard call processing at step 304. If the number is identified as a VHP number, VHP server 112 accesses VHP database 114 to identify the subscriber numbers in the family or group (step 306). At step 308, VHP server 112 determines whether the call is initiated from a family or group subscriber number associated with the VHP number in VHP database 114. In one embodiment, if the calling number is not a family or group subscriber number, at step 310 the caller may enter a Personal Identification Number (PIN) associated with the VHP number. This feature allows family or group members to connect to the VHP number if, for example, they are making a call from a number not associated with the VHP number in database 114. In one embodiment, a single PIN is assigned to each subscriber in the family or group. In other variations, each member subscriber may be assigned a unique PIN. If the calling party does not enter an authorized PIN, the call may be forwarded to VHP voicemail 116 (Step 312) and/or terminated (step 314). In one embodiment, a prerecorded message indicating that the calling party is not authorized to access the number may be transmitted to the calling party.

If the calling party's number is identified as a family or group member, or if the calling party enters an authorized PIN for a closed group or system, VHP server 112, reserves a conference bridge in GMSC 104 (step 316) and simultaneously initiates calls to each of the other family or group numbers, excluding the calling subscriber number (step 318). VHP server 112 also initializes a ring timer or counter at step 320. If the ring timer or counter times out (step 322) before a family or group member answers the call, VHP server 112 routes the call to VHP voicemail (step 324) and/or terminates the call (step 326). VPH server 112 may then transmit a SMS message to the group or family members indicating that a call was missed and/or that a voice message has been received (step 328).

In one embodiment, the ring timer or counter is preferably set for an interval or number of rings such that a servicing switch will not connect a call to the voicemail for each individual member of the group. This feature conserves available resources. For example, in the case of group having five members, a single voicemail is recorded on VHP voicemail 116, rather than five messages, one in each of the group or family member's individual voicemail boxes. It also prevents a call between answering parties from being recorded on the voicemail of non-answering members of the family or group.

If a group or family member answers the call (step 330) the call is connected via the conference bridge (step 332) and an optional grace timer is initialized (step 334). The other family or group member's telephones will continue to ring during the interval while the grace timer runs. The optional grace timer allows other family or group members to answer and connect to the call (steps 336, 338) during the interval until the grace timer times out at step 340. When the grace timer times out, the calls to non-answering group or family members are terminated (step 342) and VPH server 112 may then transmit a SMS message to the non-answering group or family members indicating that a call was missed and/or that a voice message has been received (step 344).

At step 346, VPH server 112 detects that one or more members of the group or family have disconnected, (e.g. hung up) from the call. VPH server 112 disconnects that member from the conference bridge and then determines whether more than one group or family member is still on the call, e.g., connected to the conference bridge (step 348). If only one party remains connected the call is terminated (step 350) and VPH server 112 releases the conference bridge (step 352).

The method illustrated in FIG. 3 has the advantage of not requiring dedicated software/hardware for conferencing on the cellular telephone devices used by the family or group members. In one embodiment, the hardware and software used in methods according to the invention is switch-based, e.g. on the switching platform or platform(s) of the cellular provider and can be accessed from any connection in the telephone network. Other cellular telephone conferencing systems and methods typically require specific hardware and/or software in the cellular device and/or require each member of a conference to dial into a conference. In one variation, the method allows for a group or family member to initiate a call to a routable telephone number to establish or initiate a call to other or selected family or group members from any connection on the telephone network. In other embodiments, a family or group member may initiate a call to other group or family members within a cellular provider coverage area or at a specific location.

Referring still to FIG. 3, if the called number does not correspond to a group number, a locator request is transmitted to a separate HLR platform including a database of a routable VHP numbers. In this embodiment, if the called number corresponds to a VHP number, the number is registered in the database and the call is routed to the VHP number for the VHPSCF. Calls may then be initiated as described in connection with FIG. 3 beginning at step 318. If not, the call may be terminated at step 376.

Figure 4:
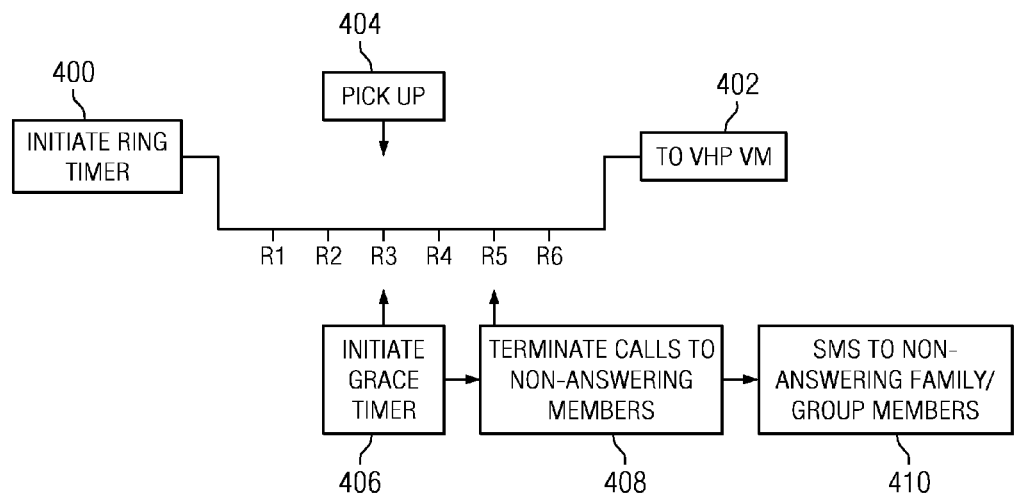
FIG. 4 is a graphical representation of timing functions used in one embodiment of group conferencing telephone call processing according to the disclosure.

FIG. 4 is a further graphical representation of the operation of the ring and an optional grace timer. At step 400 (step 320 of FIG. 3), the ring timer is initialized and started. In the illustrated embodiment, the ring timer is set for a total of six rings, designated R1-R6. Referring to FIGS. 1 and 4, if no family or group member answers the calls initiated by VHP server 112 (FIG. 1), at the end of the six rings VHP server 112 routes the call to VHP voicemail server 116 at step 402. If, on the other hand, a first family or group member picks up the call at R3 (step 404), the ring timer is canceled, and a grace timer is initialized and started at (step 406).

In this example, the grace timer may be set for an interval corresponding to two additional rings, R4 and R5 after the termination of the ring timer. If any additional family or group members answer during the time interval between R3 and R5, they will be connected to the conference bridge and added to the call. At R5 the grace timer times out and any calls to non-answering family or group member are terminated (step 408). VHP Server 112 may then direct a SMS message to the non-answering family or group members to inform them of the call (step 410). The non-answering family or group members may then dial the VHP number or use a call back function on their cellular devices to join the call if it is still in progress.

Figure 5:
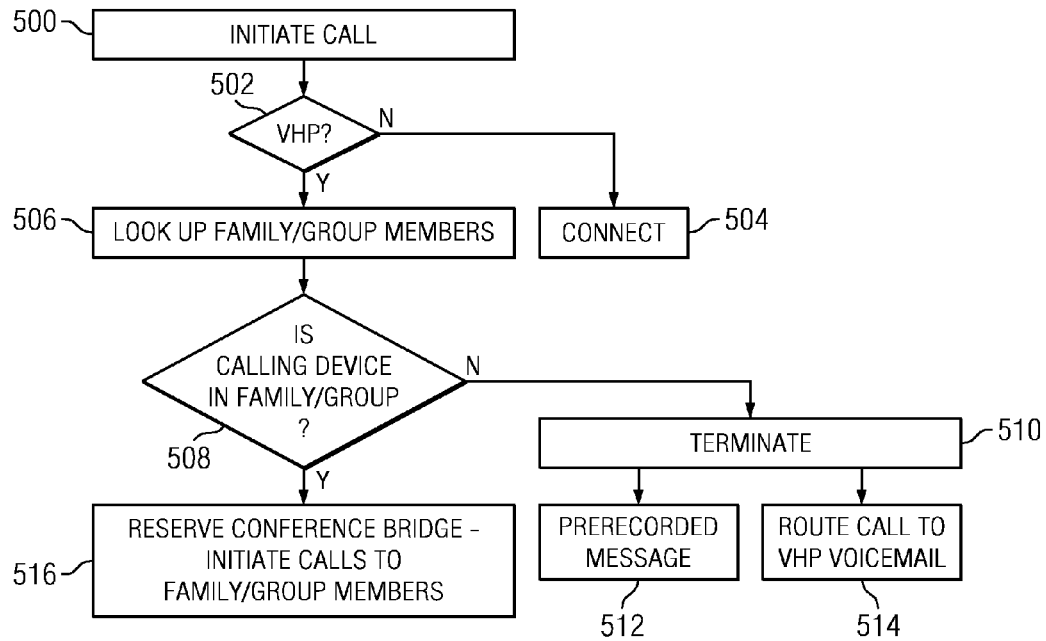
FIG. 5 is a flow chart illustrating closed group call processing for group conferencing telephone call processing according to one embodiment of the disclosure.

FIG. 5 is a flowchart illustrating call processing in a system using "closed" VHP call processing. Referring to FIGS. 1 and 5, at step 500 a call is initiated and routed to GMSC 104. At step 502, GMSC 104 determines whether the call is directed to a routable VHP number. If not, the call is connected with standard call processing at step 504. If the call is to a routable VHP number, VHP server 112 accesses VHP database 114 to identify the subscriber numbers in the family or group (step 506). At step 508, VHP server 112 determines whether the call is initiated from a family or group subscriber number associated with the VHP number in VHP database 114. If the call is from a subscriber number not associated with the VHP number in the VHP database, the call is terminated at 510. In one embodiment, VHP server 112 may direct a prerecorded message to the calling party to inform the party that he or she is not authorized to access the VHP number (step 512). In other embodiments, VHP server 112 may direct the call to VHP voicemail server 116 (step 514). If the call is from a subscriber number associated with the VHP number in VHP database 114, calls to the remaining family and group members may be initiated at step 516 and processed as described in connection with FIG. 3 beginning at step 316.

Figure 6:
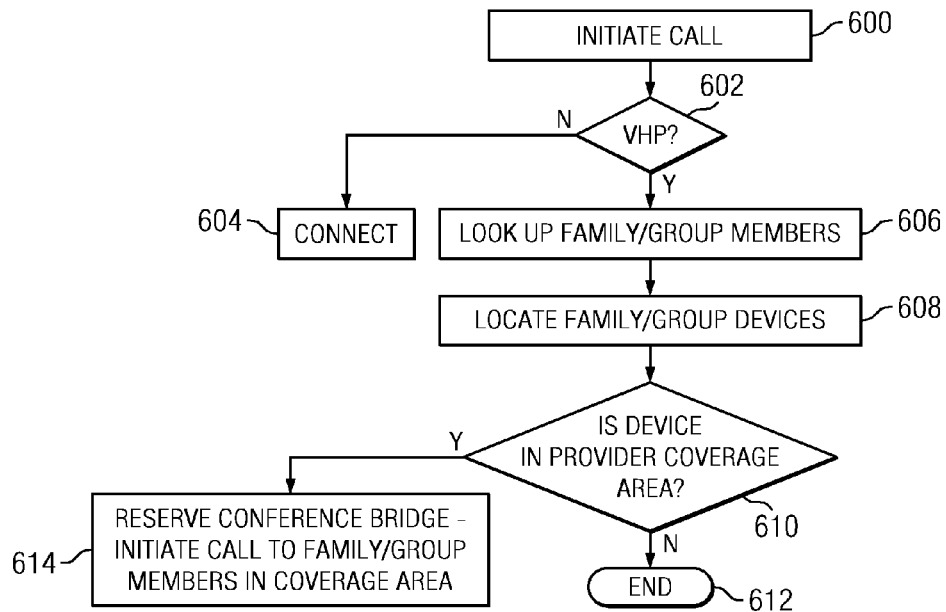
FIG. 6 is a flow chart illustrating closed area call processing for group conferencing telephone call processing according to one embodiment of the disclosure.

FIG. 6 is a flowchart illustrating call processing in a system using VHP call processing wherein calls are connected only to subscriber units within the cellular providers coverage area. In some instances, the service provider and/or customers of the service provider may not wish to incur long distance and/or roaming charges in connection with calls to family or group members outside of the provider's coverage area. Referring to FIGS. 1 and 6, at step 600 a call is initiated and routed to GMSC 104. At step 602, GMSC 104 determines whether the call is directed to a routable VHP number. If not, the call is connected with standard call processing at step 604. If the call is to a routable VHP number, VHP server 112 accesses VHP database 114 to identify the subscriber numbers in the family or group (step 606).

After identifying the family or group subscriber numbers, VHP server 112 then accesses the Visitor Location Record (VLR) and/or the Home Record Locator (HLR) (step 608) for the cellular provider's service area to identify those group or family member subscriber units located within the service area. The group or family member subscriber units not located within the provider's service area are excluded from the group at step 612. If the calling subscriber device is a member of the family or group, that number is also excluded from the group. The VHP server 112 then initiates calls to only the family and group members within the provider's service area at step 614 and processes the call as described in connection with FIG. 3 beginning at step 316.

In some instances a family or group member may only wish to connect with other family or group members at a specific location. For example a family or group member may wish to contact another member only if that member is at home or at another at a specific location. Recently, cellular telephone handset manufacturers have implemented technology enabling determination of the location of cellular devices. Known technology for locating cellular handsets is based on the use of the Global Positioning System (GPS) and/or radio signal triangulation technology. Thus, a location specific VPN number may be created in VPN database 114 by adding or associating a location with the VPN number such that calls to the VPN number will only be routed to the associated subscriber numbers at the selected location.

Figure 7:
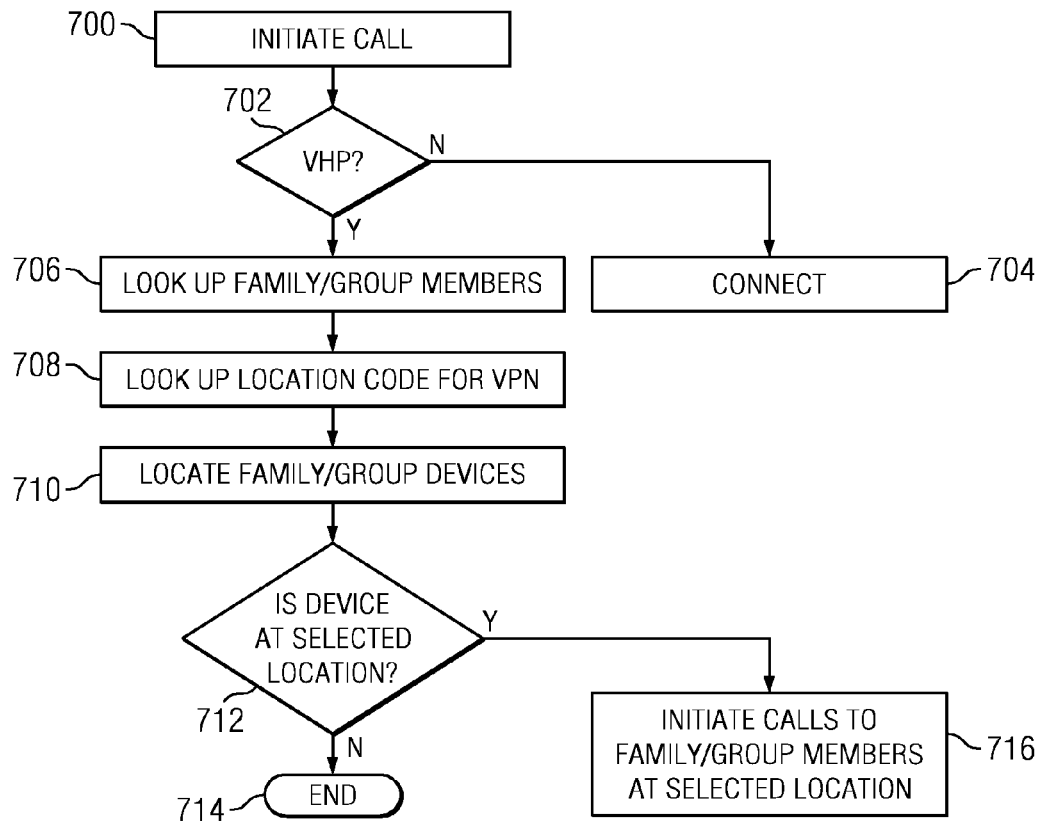
FIG. 7 is a flow chart illustrating specific location call processing for group conferencing telephone call processing according to one embodiment of the disclosure.

FIG. 7 is a flowchart illustrating call processing in a system using VHP call processing wherein calls are connected only to subscriber units at a specific location. Referring to FIGS. 1 and 7, at step 700 a call is initiated and routed to GMSC 104. At step 702, GMSC 104 determines whether the call is directed to a routable VHP number. If not, the call is connected with standard call processing at step 704. If the call is to a routable VHP number, VHP server 112 accesses VHP database 114 to identify the subscriber numbers in the family or group (step 706). After identifying the family or group subscriber numbers, VHP server 112 accesses VHP database 114 to determine a location code associated with the VHP number, for example a latitude and longitude at step 708. Alternatively, the location code may be stored on the calling party's cellular device and transmitted to VPH server 112 at the time the call to the VPH is initiated.

After obtaining a location code, VPH server 112 may then query the family or group member subscriber devices to determine the location of the devices (step 710). VPH server 112 then compares the location(s) of the family or group member subscriber devices to the specified location (step 712). Those family or group member subscriber devices not at the specified location are excluded from the group (step 714). If the calling subscriber device is a member of the family or group, that number is also excluded from the group. VHP server 112 then initiates calls to only the family and group members at the specified location at step 714 and processes the call as described in connection with FIG. 3 beginning at step 316.

Figure 8:
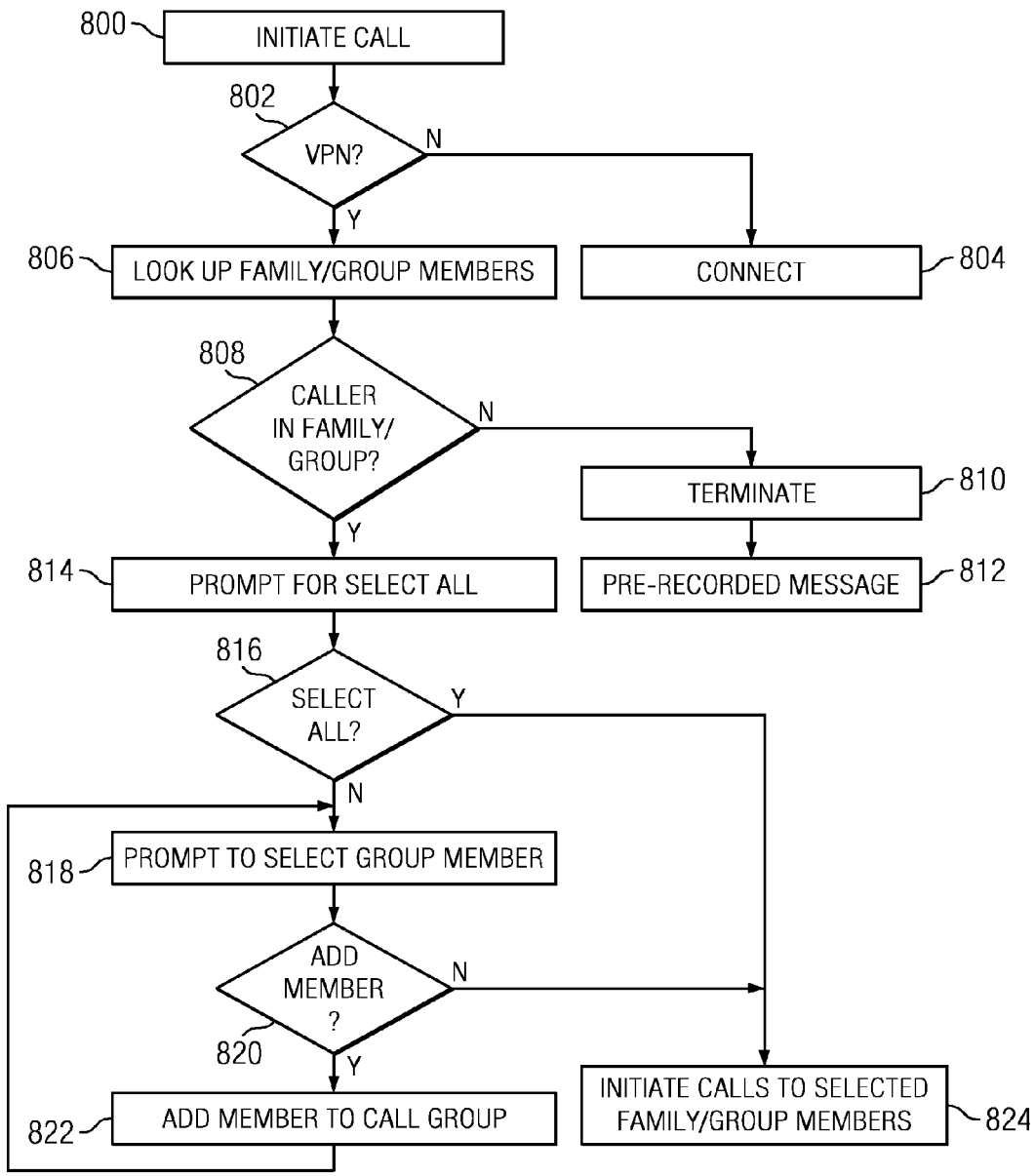
FIG. 8 is a flow chart illustrating selected member call processing for group conferencing telephone call processing according to one embodiment of the disclosure.

In some instances, a family or group member may wish to place calls only to other selected family or group members. FIG. 8 is a flowchart illustrating call processing in a system using VHP call processing wherein calls are connected only to subscriber units selected by the calling family or group member. Referring to FIGS. 1 and 8, at step 800 a call is initiated and routed to GMSC 104. At step 802, GMSC 104 determines whether the call is directed to a routable VHP number. If not, the call is connected with standard call processing at step 804. If the call is to a routable VHP number, VHP server 112 accesses VHP database 114 to identify the subscriber numbers in the family or group (step 806). After identifying the family or group subscriber numbers, VHP server 112 confirms that the calling subscriber device is a member of the family or group (step 808). If the calling party is not a member of the family or group, the call is terminated.

In one embodiment, VHP server 112 may direct a prerecorded message to the calling party to inform the party that he or she is not authorized to access the VHP number and/or request that the caller enter a PIN number to access the VHP number (step 812).

At step 814, VHP server transmits a selection prompt to the calling family or group. The prompt may be a prerecorded voice message, an SMS message, a tone or other indicator, prompting the calling family or group member to make a selection. For example, VPH server 112 may transmit a prerecorded voice or SMS message such as "Press 1 to Call All Members, Press 2 to Continue." At step 816, the calling family or group member may enter or press 1 to select all family or group members for inclusion in the call. If the calling member selects all, the VHP server 112 then initiates calls to all family and group members at step 824 and processes the calls as described in connection with FIG. 3 beginning at step 316.

Alternatively, if the calling family or group member does not wish to include all of the family or group members on the call and presses 2, VHP server 112 may then transmit a second selection prompt to the calling family or group member (step 818). For example, VPH server 112 may transmit a prerecorded message such as "Press 1 to add xxx-xxx-xxxx to the call group, Press 2 to add another member, Press 3 to connect." In other embodiments, a group member name may be associated with the member's number and used in connection with the message. For example the message may be "Press 1 to add John to the call group, Press 2 to add another member, Press 3 to connect." If the calling family or group member presses 1, (step 820) VPH server 112 may then add cellular telephone xxx-xxx-xxxx to a temporary call group (step 822).

If the calling member presses 2, VHP server 112 may return to step 820 and re-transmit the prerecorded message including the number or name of the next member in the group and the calling member may select or decline (step 822) to have the next member of the group included in the call. Steps 818 to 822 may be repeated for each group or family member until the calling member has selected those members to be included in the call group. After the calling member has completed the selection process, he or she may press 3 and VHP server 112 will initiate calls to the selected members at step 824 with the call being processed as described in connection with FIG. 3 beginning at step 316.

Figures 9, 9A:
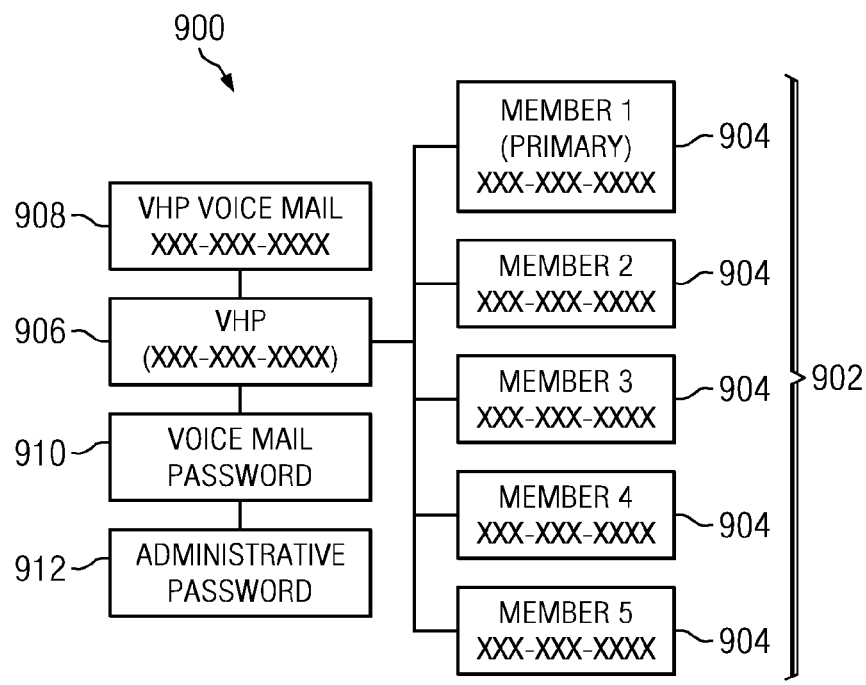
FIG. 9 is a graphical representation of a record in a data base used in methods according to the disclosure.
FIG. 9A is a representation of a data table that may be established in connection with different members of the family or group according to the disclosure.

FIG. 9 is a graphical representation of a record 900 for a family or group in VHP database 114. As illustrated, each family or group 902 member's telephone number 904 is associated with a single, routable VHP number 906 such that VHP server 112 can access the member's telephone numbers in VHP database 114 when a call is placed to the VHP number. In one embodiment, VHP number 906 may have an associated telephone number 908 for accessing the voicemail box of for the VHP number. A first password 910 may be associated with the VHP number to permit one or more family or group members to access the voicemail box for the VHP number. An administrative password 912 may be associated with VHP number 906. The administrative password allows a primary member, for example Member 1, to make changes to functions associated with the VHP number. For example, the primary member may designate which other members are allowed to access the VHP voicemail box and delete messages from the voicemail box. In some embodiments, the first password and the administrative password may be same.

FIG. 9A is a representation of a data table that may be established in connection with different members of the family or group. In one embodiment, a primary member or administrator may determine when phone calls may be made or received, whether a given member of the group may receive voice mail, text messages, mms messages and the like and the time frame in which the messages can be made or received. The primary member or administrator may also designate which, if any, members of the family or group may change features or options associated with the service. In one embodiment, the primary member or administrator may initiate or change options and/or services provided to the group members by means of a service provider website, an automated phone system or by contacting the service provider.

Figure 10:
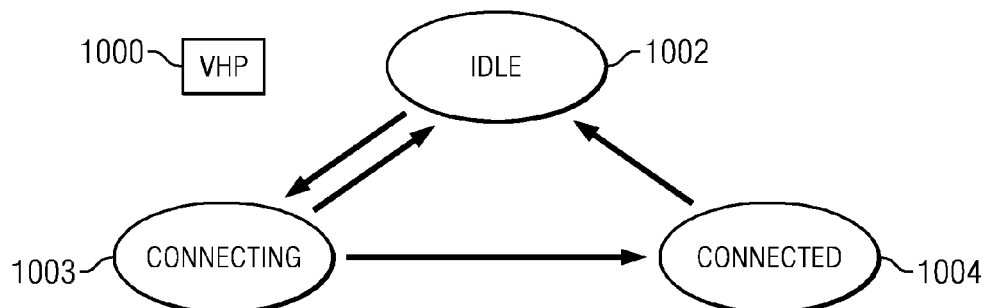
FIG. 10 illustrates call states of a routable telephone number in accordance with one embodiment of the group conferencing telephone call processing method of the disclosure.

Referring now to FIG. 10, the VHP may be implemented with a Virtual Home Phone Session Control Function resident on one or more of GMSC 104 (FIG. 1.), an MSC 106 and/or VHP server 112 or a combination thereof, wherein each VHP number 1000 contains a minimum of 3 VHPSCF call states: idle 1000, connecting 1002 and connected 1003. VHPSCF call state changes are represented by the arrowed lines and, as illustrated, an idle state 1001 may become a connecting state 1002 and a connecting state 1002 may transition to an idle state 1001. A connecting state 1002 may become a connected state 1003 and a connected state 1003 may become an idle state 1001.

Figure 11:
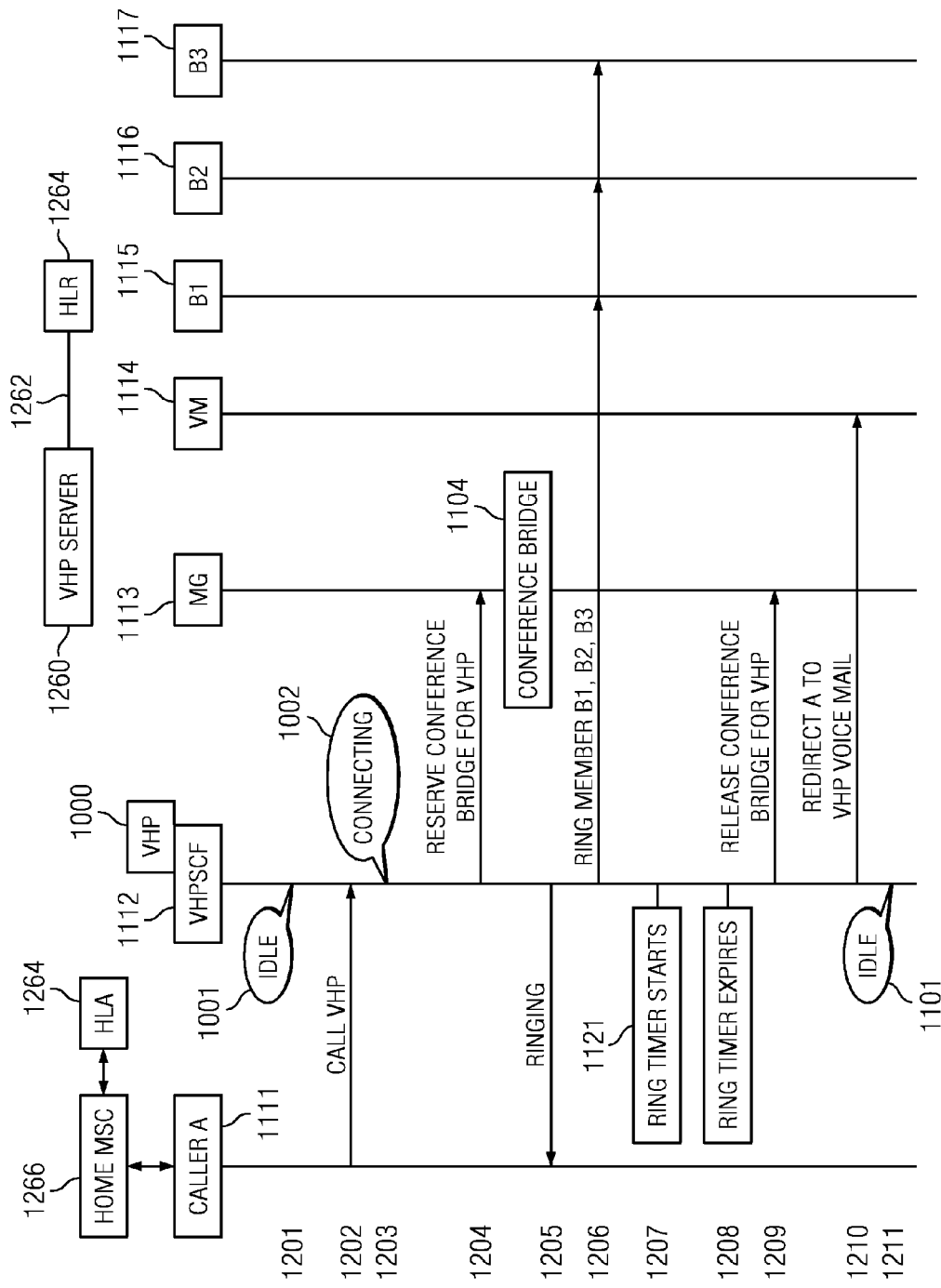
FIG. 11 illustrates the call processing logic and information flow among multiple entities in accordance with one embodiment of the group conferencing telephone call processing method of the disclosure when a call is not answered by any group or family members.

FIG. 11 illustrates call processing logic and information flow among multiple entities when a call to the VHP number in the idle state is not answered by any of the members. Many entities identified in FIG. 2 are repeatedly used in the following drawings. Virtual Home Phone number VHP 1000 exists logically in VHPSCF 1112. Each family member has his or her own telephone device and associated telephone number or identifier. Examples of telephone devices include a mobile phone in the cellular network, a home phone in the PSTN and a SIP phone in the wireless or fixed line IP network. Each family member's telephone device is served by a call processing function that can set up and release calls to and from the respective telephone device.

The combination of a family member's telephone device and its respective serving call processing function is represented by Bi where i=1, 2, 3 . . . to n, the total number of members in a family. Thus, as illustrated, B1 1115 represents a first family member, B2 1116 represents a second family member and B3 1117 represents a third family member. Caller A 1111 represents the combination of the telephone device and an associated serving call processing function that calls VHP 1000. Caller A 1111 need not be a subscribing family or group member.

VHPSCF 1112 controls a plurality of media gateways MG 1113 using protocols such as Gateway Control Protocol, the ITU-T Recommendation H.248. MG 1113 contains the resources of conference bridge 1104 which allows simultaneous audio communication among all parties connected to the conference bridge. VHPSCF 1112 can send commands to MG 1113 to reserve a conference bridge 1104, to add a party to the conference bridge, remove a party from the conference bridge 1104 and to release the conference bridge. VHPSCF 1112 can also redirect unanswered calls to the voicemail system VM 1114.

Referring still to FIG. 11, the process begins at step 1201 wherein VHP 1000 is in the idle state 1001. At step 1202, VHPSCF 1112 detects Caller A 1111 calling VHP 1000. VHPSCF 1112 changes call state of VHP 100 to the connecting state at step 1203 and at step 1204 commands MG 1113 to reserve conference bridge 1104 resource for VHP 1000.

At step 1205 VHPSCF 1112 informs Caller A 1111 of ringing the called VHP 1000. MG 1113 reserves conference bridge 1104. At step 1206, VHPSCF 1112 rings, or calls, each of the family members B1 1115, B2 1116 and B3 1117, respectively. If Caller A 1111 happens to be a family member, the number is excluded from the list of numbers that VHPSCF 1112 rings. A ring timer 1121 is started at step 1207. In this case, VHPSCF 1112 detects that ring timer 1121 expires or times out before any family member B1 1115-B3 1117 answers the calls. In one embodiment, if a family member requests to redirect the call to the voicemail box associated with his or her individual subscriber number before ring timer 1112 expires, VHPSCF 1112 terminates the request and processes the call as if the family member did not answer.

At step 1209 VHPSCF 1112 directs a command to MG 1113 to release the previously reserved conference bridge 1104 and at step 1210 VHPSCF 1112 redirects the call from Caller A 1111 to voicemail system VM 1114 for VHP B 1000. The call state of VHP 1000 is changed from connecting to idle at step 1211.

Referring still to FIG. 11, in one embodiment, a VHP number and associated data is registered in a data base maintained on a VHP server 1260. Upon registration, VHP server 1260 initiates a registration request 1262 to HLR 1264. The VHP number is entered into the HLR 1264. HLR 1264 may not distinguish the VHP number from other numbers in the database; consequently the VHP number is simply an emulation of other phone numbers stored on HLR 1264. Thus, when caller A initiates a call to the VHP number at 1266, the call is routed to the home MSC which in turn communicates with HLR 1264 to obtain the necessary information to complete the call. Once the data necessary to complete the call is obtained, home MSC 1266 connects the call in accordance with established protocol and the call is processed as illustrated and described in connection with FIG. 11.

Figure 12:
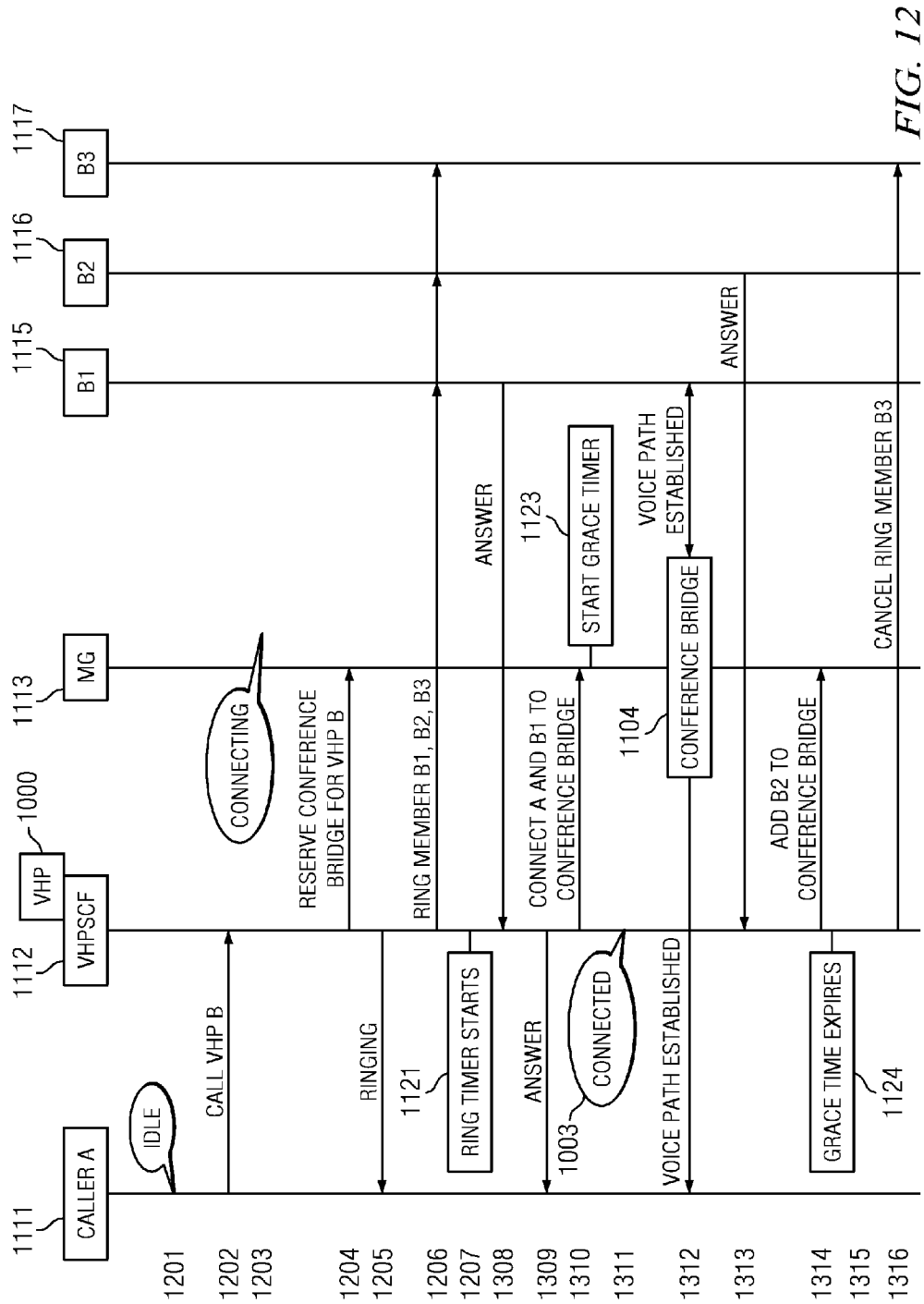
FIG. 12 illustrates the call processing logic and information flow among multiple entities in accordance with one embodiment of the group conferencing telephone call processing method of the disclosure when a call is answered by at least one group or family member.

FIG. 12 is an illustration of the call processing logic and information flow among multiple entities when a call to the VPN number at the idle state is answered by at least one family or group member. Steps 1201 through 1207 in FIG. 11 are reproduced in FIG. 12 to show the common steps up to the point that ring timer 1121 is initiated at step 1207. Conference bridge 1104 in is omitted from FIG. 12 to simplify the drawing.

At step 1308 VHPSCF 1112 detects that family member B1 1115 has answered the call and cancels or stops ring timer 1121 before it expires. VHPSCF 1112 notifies Caller A 1111 that the call has been answered at step 1309. At step 1310 VHPSCF 1112 commands MG 1113 to add parties Caller A 1111 and family member B1 1115 to the previously reserved conference bridge 1104. VHPSCF 1112 starts an optional grace timer 1123 at step 1310 and continues to monitor for more family members to answer the calls initiated in step 1206.

At step 1311 VHPSCF 1112 changes the call state of VHP 1000 to the connected state 1003. Voice paths are established between Caller A 1111 and family member B1 1115 through conference bridge 1104 at step 1312 and at step 1313, VHPSCF 1112 detects that family member B2 1116 answers the call. VHPSCF 1112 then commands MG 1113 to add a new party family member B2 1116 to conference bridge 1104 at step 1314. At step 1315, VHPSCF 1112 detects that grace timer 1124 has expired and at step 1316, cancels or terminates the call to family member B3 1117 at step 1316.

Figure 13:
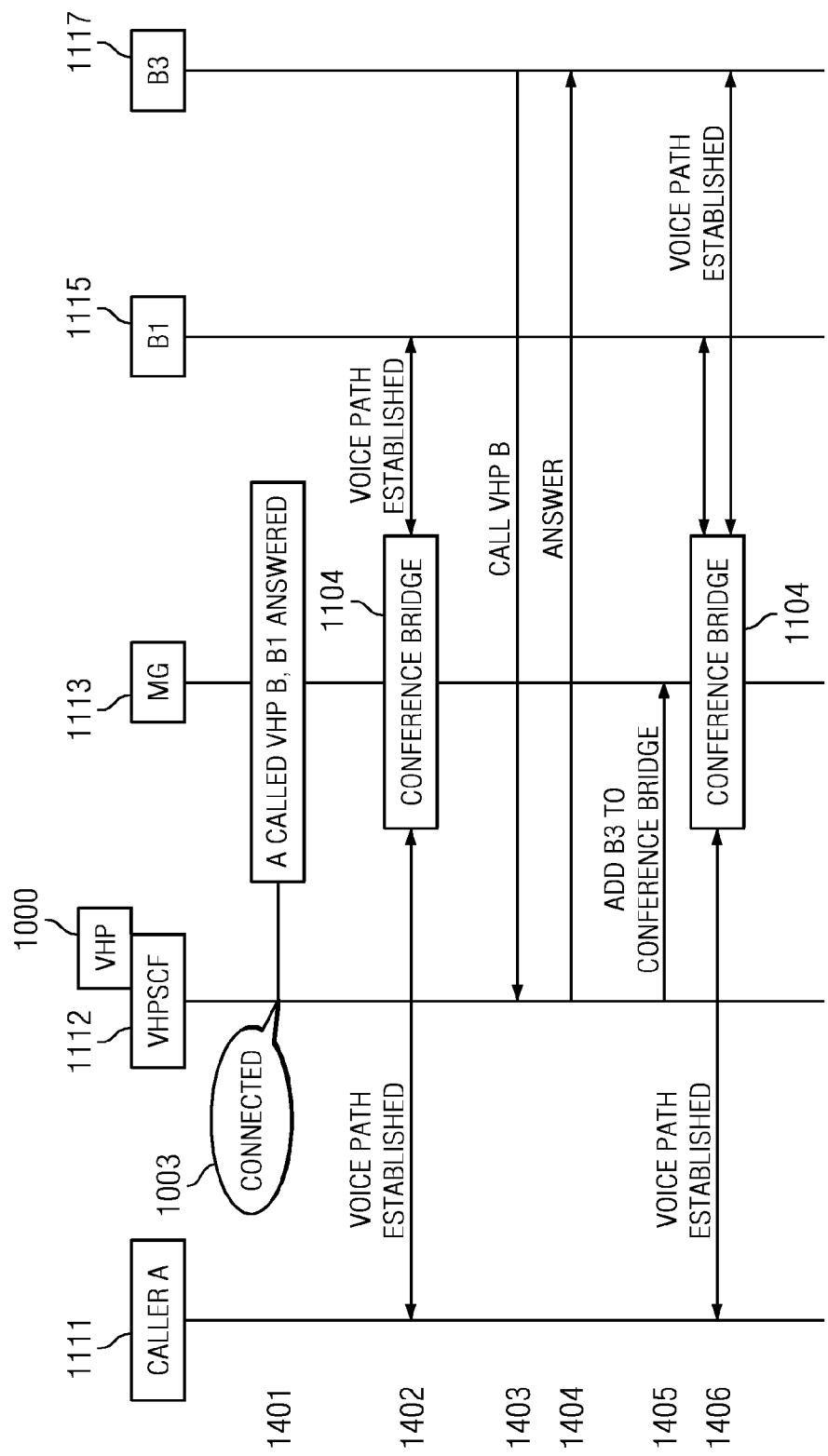
FIG. 13 illustrates the call processing logic and information flow among multiple entities in accordance with one embodiment of the group conferencing telephone call processing method of the disclosure when a group or family member calls to join a previously established call.

FIG. 13 illustrates the call processing logic and information flow among multiple parties when a member calls VHP number 1000 at the connected state 1003 to join an already established call. At step 1401 VHPSCF 1112 reaches a connected status wherein Caller A 1111 called VHP 1100 and family member B1 115. In the process, VHPSCF 1112 sets VHP 1000 call state to connected state 1003. At step 1402 a voice path is established between Caller A 1111 and family member B1 1115 through Conference Bridge 1104.

With VHP 1000 in the connected state VHPSCF 1112 detects a call from family member B3 1117 to VHP 1000 at step 1403 and notifies family member B3 1117 the call is answered at step 1404. At step 1405 VHPSCF 1112 commands MG 1113 to connect family member B3 1117 to the conference bridge 1104 currently in use by Caller A 1111 and family member B1 1115. Voice paths are established among Caller A 1111, family member B1 1115 and family member B3 1117 through Conference Bridge 1104 at step 1406.

Figure 14:
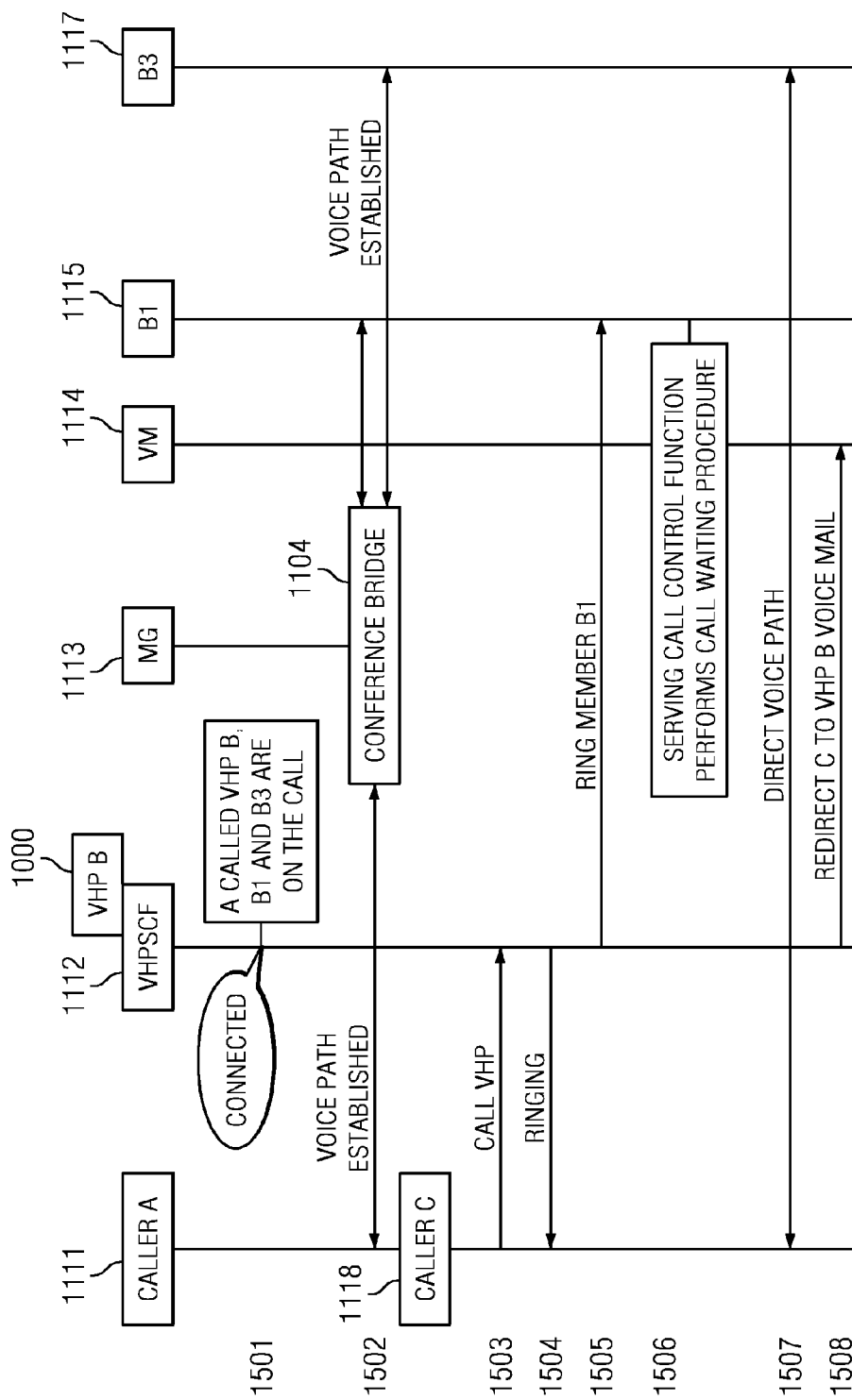
FIG. 14 illustrates the call processing logic and information flow among multiple entities in accordance with one embodiment of the group conferencing telephone call processing method of the disclosure when a non-member of a family or group calls when a previously established call is in progress.

FIG. 14 illustrates call processing logic and information flow among multiple entities when a non-member calls VPN 1000 at the connected state. At step 1501 VHPSCF 1112 is in a connected state with Caller A 1111 and that family members B1 1115 and B3 1117 on the call. Voice paths are established among Caller A 1111, family member B1 1115 and family member B3 1117 through conference bridge 1104 at step 1502. At step 1503 VHPSCF 1112 detects an incoming non-member call from Caller C 1118 calls VHP 1000 and informs Caller C 1118 of ringing VHP 1000 at step 1504.

At step 1505 VHPSCF 1112 selects a family member, in this case B1 115, who is still on the call with Caller A 1111 and family members B1 1115 and B3 1117. VHPSCF 1112 may use preprogrammed rules to select and direct the call from non-member C 1118 to family members on a previously established call. For example, VHPSCF 1112 may first select the primary family member, second the first answering family member and third the first remaining family member. In this case, VHPSCF 1112 rings, or calls family member B1 1115.

At step 1506 since family member B1 1115 already has an active call, the serving call control function of family member B1 1115 performs standard call waiting procedure. Family member B1 1115 may choose to answer or not answer the new call from non-member C 1118. If family member B1 1115 answers the call, VHPSCF 1112 connects Caller C 1118 and family member B1 1115 directly in a separate voice path. Alternatively, if family member B1 1115 elects not to answer the call, VHPSCF 1112 redirects Caller C 1118 to the voicemail system VM 1114 for VHP 1000.

Figure 15:
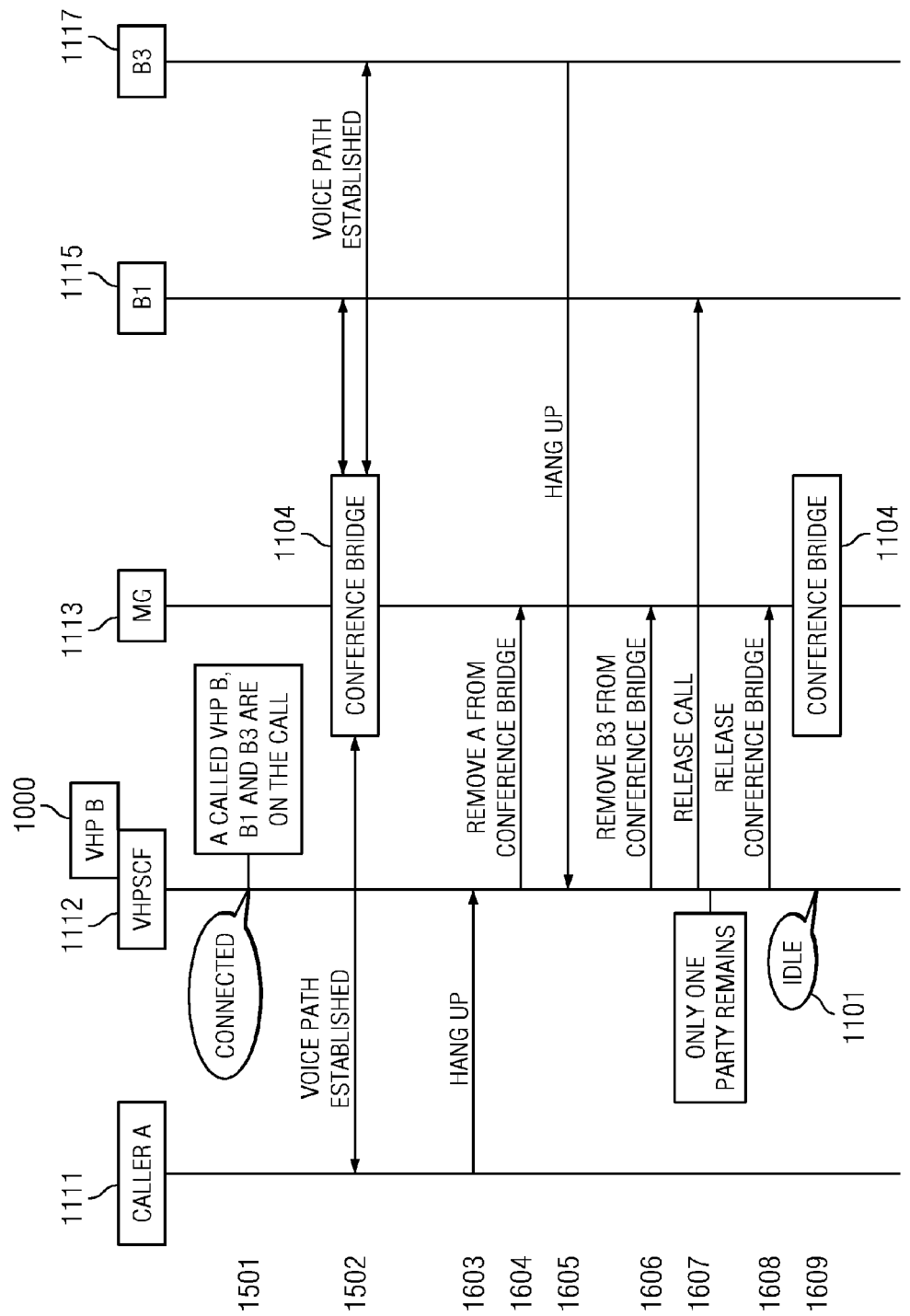
FIG. 15 illustrates the call processing logic and information flow among multiple entities in accordance with one embodiment of the group conferencing telephone call processing method of the disclosure for terminating a call session.

FIG. 15 illustrates the call processing logic and information flow among multiple entities for terminating a VHP call session. Steps 1501 and 1502 from FIG. 14 are repeated in FIG. 15 to show that Caller A 1111 and family members B1 1115 and B3 1117 connected to conference bridge 1104. At step 1603 VHPSCF 1112 detects a hang up from Caller A 1111 and commands MG 1113 to remove Caller A 111 from the conference bridge at step 1604.

At step 1605 VHPSCF 1112 detects a hang up from family member B3 1117 and commands MG 1113 to remove family member B3 1117 from the conference bridge 1104 at step 1606. VHPSCF 1112 then determines that only one party remains on the call at step 1607. At step 1608, VHPSCF 1112 sends a release message to the remaining party family member B3 1117 to release the call and directs MG 1113 to remove family member B3 1117 from conference bridge 1104. VHPSCF 1112 sets the call state of VHP 1000 to the idle state 1001 and all parties are removed from the conference bridge 1104 at step 1609.

Figure 16:
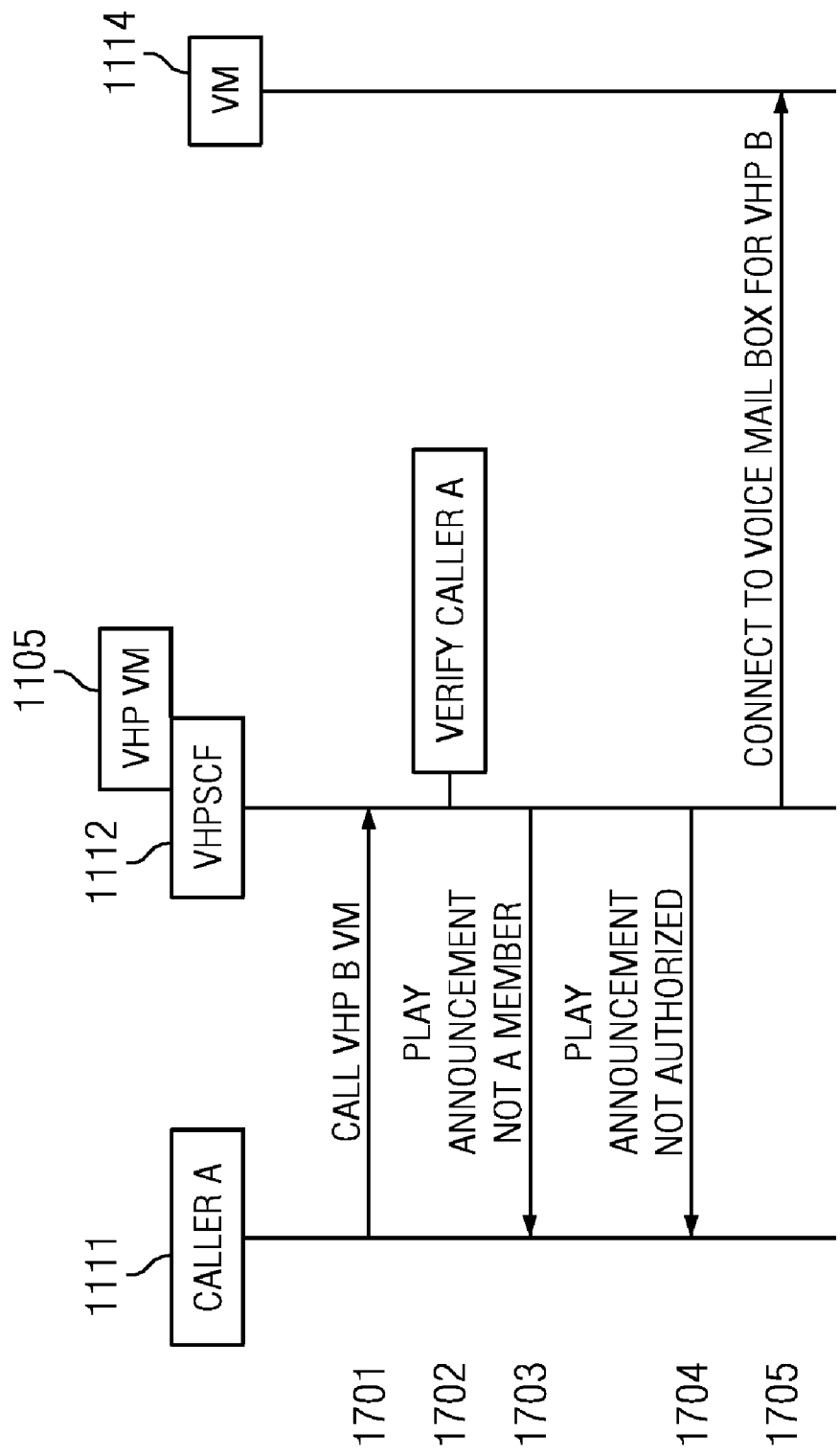
FIG. 16 illustrates the call processing logic and information flow among multiple entities in accordance with one embodiment of the group conferencing telephone call processing method of the disclosure for retrieving voicemail messages.

FIG. 16 illustrates call processing logic and information flow for retrieving VHP voicemail messages. A special number VHP VM 1105 is used for accessing voicemail messages. The VHP VM 1105 number can be unique for each VHP family represented by a particular VHP 1000 or common to all VHP families. VHP VM 1105 exists logically in VHPSCF 1112. All calls to VHP VM 1105 are processed by VHPSCF 1112. In one embodiment, voicemail may be sent to all authorized members of the group or family as an audio file, an encoded mms message, a way, aac, mp3 or other type of file. In other variations, calls to VHP VM 105 may be transcoded to video, sms, email or other formats.

At step 1701 VHPSCF 1112 detects a call to the VHP VM 1105 from Caller A 1111 and determines whether Caller A 1111 is a member of the family associated with VHP 1000 at step 1702. In this embodiment, if Caller A 1111 is not a member of the family of VHP 1000, VHPSCF 1112 plays not a member announcement and disconnects Caller A 1111 at step 1702. Similarly, if Caller A 1111 is a member the family associated with VHP 1000 but has not been authorized by the primary member of the family associated with VHP 100 to access voicemail, VHPSCF 1112 plays a not authorized announcement and disconnects Caller A 1111 at step 1704. If Caller A 1111 is a member of a VHP 1000 and is authorized by the primary member of the family associated with VHP 1000 to access voice mailbox, VHPSCF 1112 connects Caller A 1111 to the voicemail box 1114 for VHP 1000 at step 1705.

Figure 17:
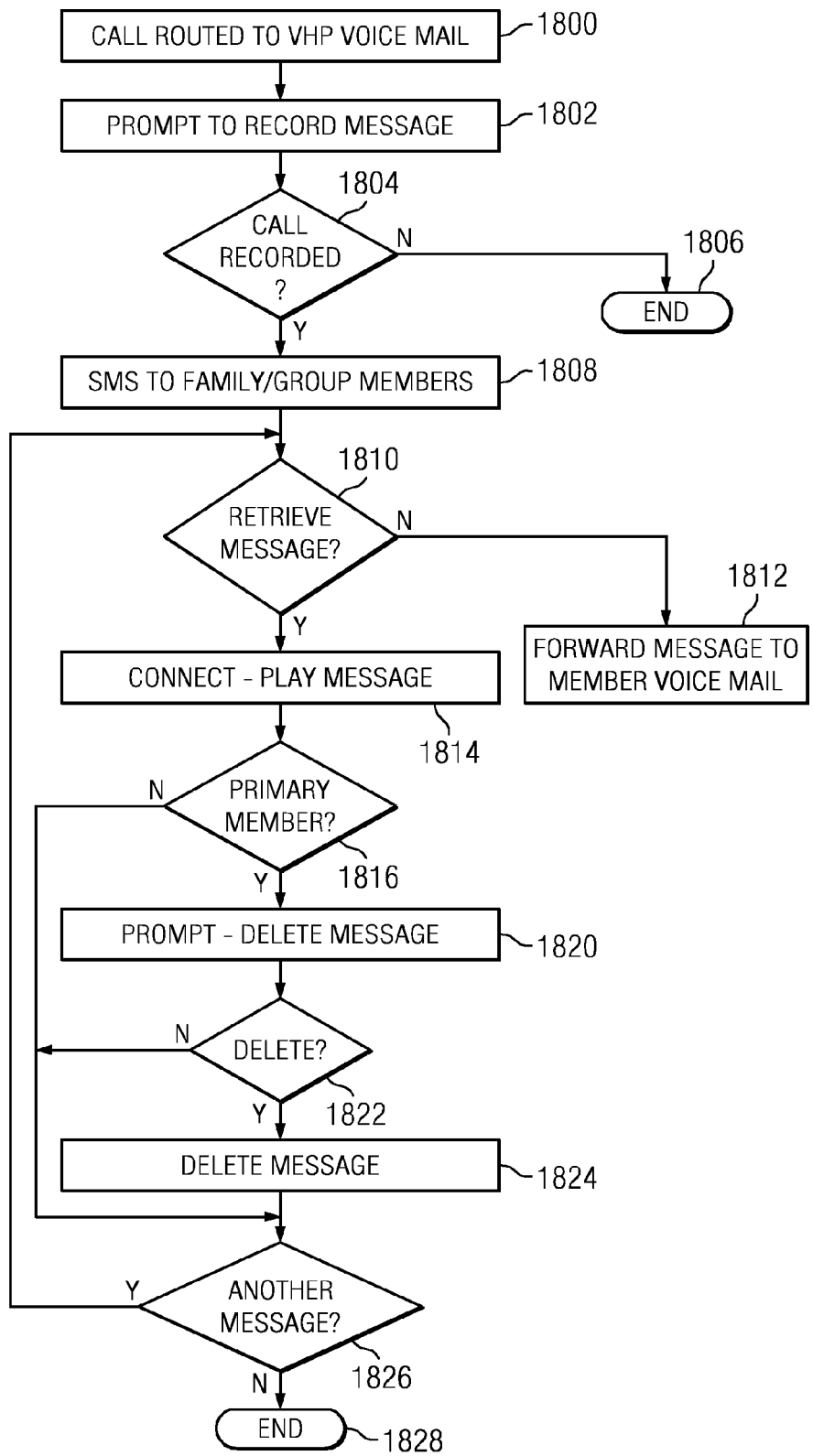
FIG. 17 is a flow chart for illustrating automatic retrieval of voicemail messages in accordance with one embodiment of the group conferencing telephone call processing method of the disclosure.

FIG. 17 is a flowchart illustrating automatic call retrieval in a system using VHP call processing wherein calls are routed to VHP voicemail box 116 (FIG. 1). At step 1800, corresponding to step 324 of FIG. 3, an incoming call to the routable VHP number is routed to VHP voicemail server 116 after no family or group members answer the calls initiated from VHP server 112. The calling party is prompted at step 1802 to record a message. If the calling party does not record a record a message at step 1804, the call is terminated at step 1806.

If a call is recorded at step 1804, VHP server 112 transmits a SMS message to one or more of the family or group members at 1808, indicating that a voice message has been retrieved. For example the SMS message may be "You have voicemail. Press #3 to listen." If a family or group member decides to listen at step 1810, he or she is presses #3 on his or her cellular subscriber device and is connected to VHP voicemail server 116 at step 1814 and the message is played. In one embodiment, if the family or group member elects not to listen to the message when the SMS message is received, the message may be forwarded to the voicemail for that individual's cellular telephone number. In other embodiments, the family or group member may call a number associated with VHP voice server 116 at a later time to retrieve the message, assuming that the primary family member or another authorized family member has not deleted the message.

After the message is played at step 1814 VHP server 112 determines whether the family member connected to VHP voicemail server 112 is the family primary member at step 1816. If the connected member is the primary member, VHP server 112 or VHP voicemail server 116 may prompt the primary member at step 1820 to determine whether the message should be deleted. For example, VHP server 112 may transmit a prerecorded voice message such as "To Delete, Press #7". If the primary member elects to delete the message at step 1822, and presses #7, the message is deleted at step 1824.

At step 1826, VHP server 112 determines whether there are additional messages on VHP voicemail server 116. If so, the process returns to step 1810 where the connected family member may choose to listen to the additional messages. If not the call is terminated at step 1828.

The invention and all of the functional operations described in this specification can be implemented in digital electronic circuitry, or in computer software, firmware or hardware, including the structural means disclosed in this specification and structural equivalents thereof, or in combination of them.

The processes and logic flows described in this specification can be performed by one or more programmable processors executing one or more computer programs to perform functions of the invention. The processes and logic flows can also be performed by, and apparatus of the invention can be implemented as, special purpose logic circuitry, e.g., FPGA (field programmable gate array) or an ASIC (application specific integrated circuit).

The fundamental principles of the implementation of the invention have been described. Nevertheless, it will be understood that various modifications may be made. Accordingly, other implementations are within the scope of the following claims.

It will be appreciated by those skilled in the art having the benefit of this disclosure that this disclosure provides call processing for group conferencing. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of providing call processing for group conferencing, comprising:
    associating cellular telephone numbers assigned to a predetermined group of subscriber cellular devices with a routable telephone number in a database whereby calls to the routable telephone number are routed to a gateway mobile switching center of a cellular service provider;
    receiving a first call placed to the routable telephone number with the gateway mobile switching center;
    accessing the database and retrieving the telephone numbers assigned to the group of cellular subscriber devices and associated with the routable telephone number;
    determining which subscriber devices are within the geographical coverage area of the cellular service provider;
    initiating calls to the cellular telephone numbers assigned to the group of cellular subscriber devices of the cellular subscriber devices in the cellular service provider's geographical coverage area;
    initiating a ring timer;
    detecting a first answer from at least one of the called cellular subscriber devices;
    connecting the first call to the first answering cellular subscriber device with a conference bridge;
    detecting one or more subsequent answers from at least one of the called cellular subscriber devices; and
    connecting cellular subscriber devices from the group of cellular subscriber devices that answer after the first answering cellular subscriber device and before the ring timer lapses.

2. The method of claim 1 further comprising initiating a grace timer at the time the first answer is detected whereby calls to non-answering cellular subscriber devices are terminated when the grace timer lapses.

3. The method of claim 1 further comprising determining which cellular subscriber devices are at a specific location and wherein the step of initiating calls to the cellular telephone numbers assigned to the group of cellular subscriber devices comprises initiating calls to only those cellular devices at the specific location.

4. The method of claim 1 further comprising transmitting a message to the non-answering cellular subscriber devices that a call was placed to the routable number.

5. The method of claim 4 wherein the message is one of an SMS message, an email message or a mms message.

6. The method of claim 1 further comprising receiving a personal identification code before initiating calls to the cellular telephone numbers assigned to the group of cellular subscriber devices.

7. A method of providing call processing for group conferencing, comprising:
    receiving a first call from a calling party telephone device to a routable telephone number associated with a gateway mobile switching center;
    accessing a database wherein the routable telephone number is associated with a predetermined group of cellular subscriber telephone numbers and retrieving the cellular telephone numbers in the predetermined group;
    determining if the calling party telephone device is assigned one of the predetermined group of cellular telephone numbers;
    initiating calls to the predetermined group of cellular subscriber telephone numbers from the gateway mobile switching center;
    initiating a ring timer;
    detecting a first answer from at least one of the called cellular subscriber devices;
    creating a voice path between the calling party telephone device and the first answering cellular subscriber device; and
    creating a voice path between the calling party telephone device and cellular subscriber devices from the predetermined group that answer after the first answering cellular subscriber device and before the ring timer lapses.

8. The method of claim 7 further comprising associating the routable telephone number with each of the predetermined group of cellular subscriber telephone numbers in the database.

9. The method of claim 7 further comprising receiving a personal identification code before initiating calls to the predetermined group of cellular subscriber telephone numbers.

10. The method of claim 7 further comprising transmitting a message to non-answering cellular subscriber telephone numbers in the predetermined group that a call was placed to the routable number.

11. The method of claim 10 wherein the message is one of an SMS message, an email message or an mms message.

12. A method of providing call processing for group conferencing, comprising:
    associating telephone numbers assigned to a predetermined group with a routable telephone number in a database whereby calls to the routable telephone number are routed to a switching center of a service provider;
    receiving a first call placed to the routable telephone number with the switching center;
    retrieving the telephone numbers assigned to the group and associated with the routable telephone number;
    determining which devices are at a specific location;
    initiating calls to the telephone numbers assigned to the group of those devices at the specific location;
    initiating a ring timer;
    detecting a first answer from at least one of the called devices;
    connecting the first call to the first answering device with a conference bridge;

detecting one or more subsequent answers from at least one of the called devices; and connecting devices from the group of devices that answer after the first answering device and before the ring timer lapses.

13. The method of claim 12 further comprising initiating a grace timer at the time the first answer is detected whereby calls to non-answering devices are terminated when the grace timer lapses.

14. The method of claim 12 further comprising determining which devices are within the geographical coverage area of the service provider and wherein the step of initiating calls to the telephone numbers assigned to the group of devices comprises initiating calls to only those devices in the service provider's geographical coverage area.

15. The method of claim 12 further comprising transmitting a message to the non-answering devices that a call was placed to the routable number.

16. The method of claim 15 wherein the message is an SMS message.

17. The method of claim 15 wherein the message is an MMS message.

18. The method of claim 15 wherein the message is an email message.

19. The method of claim 12 further comprising receiving a personal identification code before initiating calls to the telephone numbers assigned to the group of devices.

20. A method of providing call processing for group conferencing, comprising:

receiving a first call from a calling party telephone device to a routable telephone number associated with a switching center;

accessing a database wherein the routable telephone number is associated with a predetermined group of telephone numbers and retrieving the telephone numbers in the predetermined group;

receiving a personal identification code before initiating calls to the predetermined group of telephone numbers;

initiating calls to the predetermined group of telephone numbers from the switching center;

initiating a ring timer;

detecting a first answer from at least one of the called devices;

creating a voice path between the calling party telephone device and the first answering device; and creating a voice path between the calling party telephone device and devices from the predetermined group that answer after the first answering device and before the ring timer lapses.

21. The method of claim 20 further comprising associating the routable telephone number with each of the predetermined group of telephone numbers in the database.

22. The method of claim 20 further comprising determining if the calling party telephone device is assigned one of the predetermined group of telephone numbers.

23. The method of claim 20 further comprising transmitting a message to non-answering telephone numbers in the predetermined group that a call was placed to the routable number.

24. The method of claim 23 wherein the message is an SMS message.

25. The method of claim 23 wherein the message is an MMS message.

26. The method of claim 23 wherein the message is an email message.

* * * * *